(12) United States Patent
Meng et al.

(10) Patent No.: US 9,479,353 B2
(45) Date of Patent: Oct. 25, 2016

(54) SELECTIVE REESTABLISHMENT OF CABLE MODEM INTERNET PROTOCOL CONNECTIVITY

(75) Inventors: Jie Meng, Beijing (CN); Wenwen Dong, Shanghai (CN); Shuzhan Chen, Shanghai (CN); Rundong Huang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 554 days.

(21) Appl. No.: 13/272,798

(22) Filed: Oct. 13, 2011

(65) Prior Publication Data
US 2013/0097324 A1 Apr. 18, 2013

(51) Int. Cl.
*G06F 15/16* (2006.01)
*H04L 12/28* (2006.01)

(52) U.S. Cl.
CPC ................................. *H04L 12/2801* (2013.01)

(58) Field of Classification Search
CPC .................................................. H04L 12/2801
USPC .......................................................... 709/227
See application file for complete search history.

(56) References Cited

U.S. PATENT DOCUMENTS

| | | | |
|---|---|---|---|
| 7,058,007 B1 * | 6/2006 | Daruwalla | H04L 45/28 370/216 |
| 7,308,700 B1 * | 12/2007 | Fung et al. | 725/111 |
| 7,334,252 B1 * | 2/2008 | Millet et al. | 725/111 |
| 7,720,002 B1 * | 5/2010 | Beser | 370/254 |
| 7,843,810 B2 | 11/2010 | Zhang | |
| 2002/0073433 A1 * | 6/2002 | Furuta | 725/111 |
| 2002/0144284 A1 * | 10/2002 | Burroughs | H04B 1/74 725/111 |
| 2003/0177502 A1 * | 9/2003 | Kolze et al. | 725/111 |
| 2004/0096044 A1 * | 5/2004 | Olafsson | H04L 5/1438 379/93.32 |
| 2007/0033621 A1 * | 2/2007 | Roeck | 725/80 |
| 2008/0028437 A1 * | 1/2008 | Zeng | 726/2 |
| 2009/0125957 A1 | 5/2009 | Singh et al. | |
| 2010/0162336 A1 * | 6/2010 | Chang et al. | 725/111 |
| 2010/0191840 A1 * | 7/2010 | Beser | 709/221 |
| 2010/0309813 A1 * | 12/2010 | Singh et al. | 370/254 |
| 2011/0058491 A1 * | 3/2011 | Hsu et al. | 370/252 |
| 2011/0072119 A1 * | 3/2011 | Bronstein et al. | 709/222 |

\* cited by examiner

*Primary Examiner* — Philip Chea
*Assistant Examiner* — Wing Ma
(74) *Attorney, Agent, or Firm* — Edell, Shapiro & Finnan, LLC (57) ABSTRACT

Techniques are generally directed to selective reestablishment of Internet Protocol (IP) connectivity between a cable modem and a cable modem termination system (CMTS). IP connectivity between the cable modem and the CMTS is initially established through execution of a plurality of connectivity steps. After IP connectivity is lost, the cable modem determines which of the plurality of connectivity steps are desired for use in reestablishing IP connectivity, and sends a message to the CMTS indicating the desired IP connectivity step. The CMTS determines if the desired connectivity steps identified in the message may be used to reestablish IP connectivity, and sends a response message to the cable modem indicating if the desired connectivity steps may be used. IP connectivity is then reestablished using at least the desired connectivity steps.

28 Claims, 8 Drawing Sheets

SELECTIVE REESTABLISHMENT OF CABLE MODEM INTERNET PROTOCOL CONNECTIVITY

TECHNICAL FIELD

The present disclosure relates to maintaining Internet Protocol (IP) connectivity between a cable modem and a cable modem termination system.

BACKGROUND

A large number of personal/home users access the Internet through cable modem networks that utilize existing cable television infrastructure to transmit/receive Internet traffic. In a typical configuration, a personal computer is connected to a cable modem that interfaces with a coaxial, hybrid fiber/coaxial cable (HFC), or optical fiber cable (fiber-optic cable) used to provide cable television service to the home. The coaxial cable is then used to transmit both Internet and television signals to the home.

More specifically, in a cable modem network, digital data is transmitted between the cable modem, typically located at the user's home or office, and a cable modem termination system (CMTS), typically located at the head end of the network. The digital data is carried using radio frequency (RF) carrier signals. Cable modems convert digital data to a modulated RF signal for upstream transmission to the CMTS and demodulate downstream RF signals received from the CMTS to bit streams for use by computers. Similarly, the CMTS converts downstream digital data to a modulated signal, which is carried over the fiber and coaxial lines to the user's home. On the return path, the CMTS receives the modulated upstream signals and demodulates them for transmission to an external node. One example standard for transmission of data over cable networks is the Data-Over-Cable Service Interface Specification (DOCSIS).

DESCRIPTION OF EXAMPLE EMBODIMENTS

Overview

Techniques are generally directed to selective reestablishment of Internet Protocol (IP) connectivity between a cable modem and a cable modem termination system (CMTS). IP connectivity between the cable modem and the CMTS is initially established through execution of a plurality of connectivity steps. After IP connectivity is lost, the cable modem determines which of the plurality of connectivity steps are desired for use in reestablishing IP connectivity, and sends a message to the CMTS indicating the desired IP connectivity steps. The CMTS determines if the desired connectivity steps identified in the message may be used to reestablish IP connectivity, and sends a response message to the cable modem indicating if the desired connectivity steps may be used. IP connectivity is then reestablished using at least the desired connectivity steps.

Example Embodiments

Figure 1:
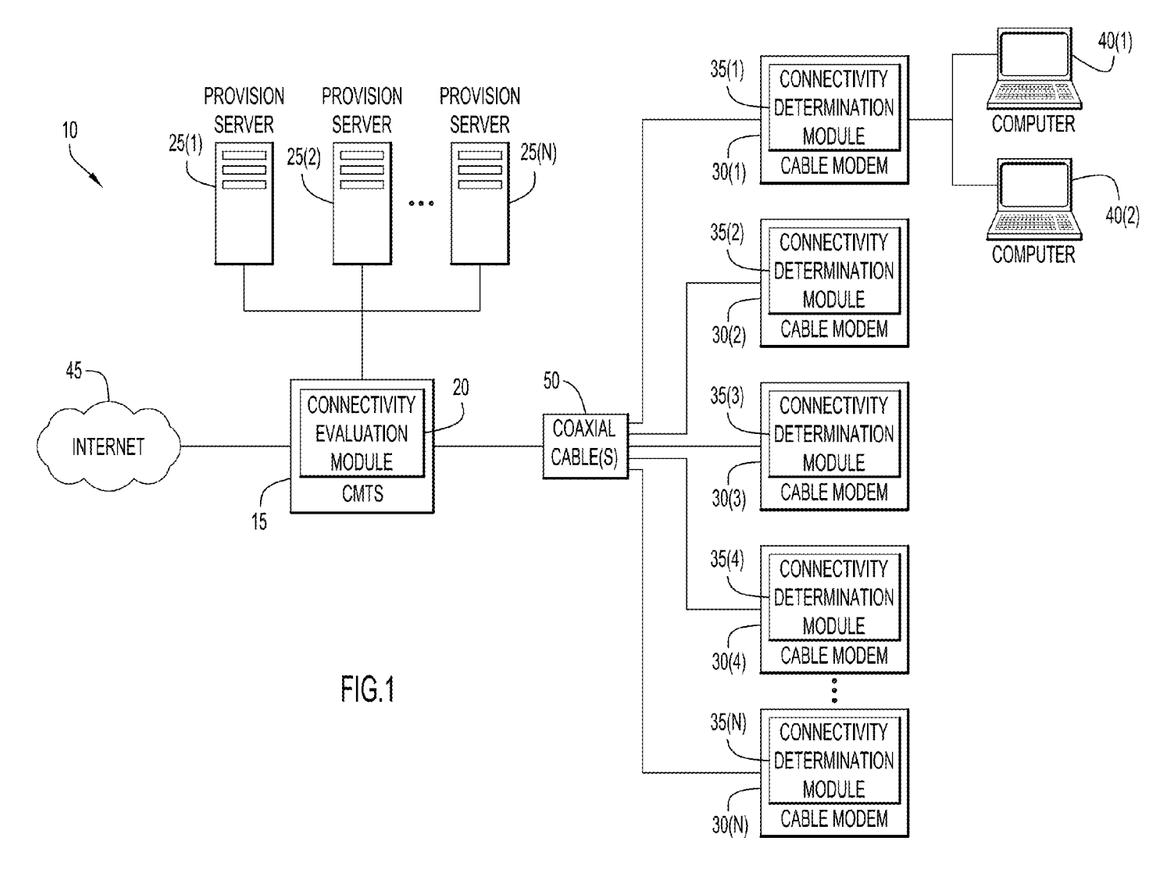
FIG. 1 is a block diagram of an example cable modem network configured for selective reestablishment of IP connectivity between cable modems and a CMTS.

FIG. 1 is a block diagram of a cable modem network 10 comprising a cable modem termination system (CMTS) 15 that includes a connectivity evaluation module 20. Network 10 also comprises plurality of provision servers 25(1)-25(N) and a plurality of cable modems 30(1)-30(N) each of which includes a connectivity determination module 35(1)-35(N), respectively. Furthermore, each cable modem 30(1)-30(N) is connected to one or more computers. For ease of illustration, the example of FIG. 1 will be described with reference to cable modem 30(1) and, as such, only computers 40(1) and 40(2) connected to cable modem 30(1) are shown in FIG. 1.

Cable modem network 10 is a network that enables users at computers 40(1) or 40(2) to access a Wide Area Network (WAN), such as the Internet 45, via a cable television infrastructure. More specifically, cable modem 30(1) is located at the user's premise (home, office, etc.) and is connected to computers 40(1) and 40(2). Cable modem 30(1) is further connected to CMTS 15 via a coaxial, hybrid fiber/coaxial cable (HFC), or optical fiber cable, generally referred to as coaxial cable 50, that is conventionally used to provide cable television service to the user's premise. In operation, coaxial cable 50 is also used by cable modem 30(1) to interface with CMTS 15 to transmit/receive Internet traffic (data, video, audio, etc.). Further details of the operation of cable modem 30(1) for interfacing with CMTS 15 are provided below.

CMTS 15 is located at the head end of cable modem network 10 (i.e., at the cable service provider's physical premises) and is configured to operate as hub for connection of cable modems 30(1)-30(N) to the Internet 45. With specific reference to cable modem 30(1), CMTS 15 receives information from cable modem 30(1) and forwards the information along to other computing devices via the Internet 45. Similarly, CMTS receives information from other computing devices via the Internet 45, and forwards the received information to cable modem 30(1). Further details of the operation of CMTS for interfacing with cable modem 30(1) are provided below.

Before cable modem 30(1) can interface with CMTS 15, the connection between the CMTS and the cable modem is initialized. Initialization of this connection includes executing a plurality of steps to initially establish Internet Protocol (IP) connectivity between cable modem 30(1) and CMTS 15, as well registering the cable modem with the CMTS. Initializing the connection between cable modem 30(1) and CMTS 15 (i.e., establishing IP connectivity and registering the cable modem with the CMTS) is sometimes referred to as "bringing the cable modem on-line."

As would be appreciated, different communication standards may be used to administer communication between a cable modem, such as cable modem 30(1), and a CMTS, such as CMTS 15. Each such standard will include different steps for bringing a cable modem on-line. For ease of reference, examples will be described herein with reference to the Data Over Cable Service Interface Specification (DOCSIS), and the typical DOCSIS steps for establishing IP connectivity between cable modem 30(1) and CMTS 15. However, it is to be appreciated that the techniques described herein may be applied in devices implementing other standards.

In accordance with DOCSIS, establishment of IP connectivity includes several steps. First, cable modem 30(1) obtains its IP address from one of provision servers 25(1)-25(N). In one example, the IP address may be obtained by cable modem 30(1) using the Dynamic Host Configuration Protocol (DHCP) (i.e., the IP address is acquired directly from a DHCP server). The DHCP transactions generally do not involve CMTS 15 but, in certain circumstances, CMTS 15 may be aware of the transactions through detection of the packets.

The IP connectivity establishment in accordance with DOCSIS may further include cable modem 30(1) obtaining or acquiring the current time and date from one of the provision servers 25(1)-25(N). The current time/date may be obtained by cable modem 30(1) using, for example, the Time-of-Day (ToD) protocol (i.e., the current time/date is acquired directly from a ToD server).

Next, IP connectivity establishment in accordance with DOCSIS includes the acquisition or download of a configuration file by cable modem 30(1) from one of the provision servers 25(1)-25(N). The configuration file may be obtained by cable modem 30(1) using, for example, the Trivial File Transfer Protocol (TFTP) (i.e., the configuration file is acquired directly from a TFTP server).

After cable modem 30(1) establishes IP connectivity with CMTS 15, cable modem 30(1) registers with CMTS 15. This registration includes sending, by cable modem 30(1), a registration request (e.g., REG-REQ) to CMTS 15. After the initial establishment of IP connectivity and registration of cable modem 30(1) with CMTS 15, the cable modem and CMTS can communicate via coaxial cable 50.

In certain circumstances, communication between cable modem 30(1) and CMTS 15 may be subsequently lost or terminated, sometimes referred to herein as the "cable modem dropping off-line." Cable modem 30(1) may drop off-line due to, for example, RF impairment, noise, a power cycle, etc.

In conventional systems, once a cable modem drops off-line, communication between the cable modem and the CMTS is reinitialized using the same IP connectivity steps and registration operations as described above with reference to the original initialization (e.g., acquiring the IP address, the current date and time, and the configuration file). The accumulation of these operations may be time consuming and, as such, results in delays in access to the Internet 45 by a user at a connected computer. Such delays may become problematic, particularly in a network in which the cable modem(s) frequently drop-offline. In addition to these time delays, execution of each of the IP connectivity steps burdens the provision servers, especially in cases of congestion (e.g., large scale recovery from, for example, a fiber node failure).

In the example of FIG. 1, cable modem 30(1) and CMTS 15 are configured to reestablish IP connectively through selective execution of the initial IP connectivity steps, referred to herein as selective reestablishment of IP connectivity. In other words, the examples of FIG. 1 allow one or more of the DOCSIS IP connectivity steps described above (i.e., acquiring an IP address, current date and time, and a configuration file) to be selectivity skipped. Because one or more of the IP connectivity steps are skipped, the time for the cable modem 30(1) to come back on-line (i.e., the time required to reestablish IP connectivity and register with cable modem with CMTS 15) is reduced, relative to conventional systems that implement all IP connectivity steps. In the example of FIG. 1, the selective reestablishment of IP connectivity is enabled by connectivity determination module 35(1) of cable modem 30(1) and connectivity evaluation module 20 of CMTS 15.

More specifically, when IP connectivity between the cable modem 30(1) and the CMTS 15 is lost (i.e., the cable modem drops off-line), connectivity determination module 35(1) of cable modem 30(1) is configured to determine which DOCSIS IP connectivity steps are desired for reestablishing IP connectivity. That is, as detailed below, connectivity determination module 35(1) is configured to evaluate information previously provided to cable modem 30(1) and determine if any such information may be used for future operations. If so, connectivity determination module 35(1) can determine that any steps typically executed to obtain such information are not desired for reestablishing IP connectivity. As such, the desired steps selected by connectivity determination module 35(1) may include only a subset of the DOCSIS steps or, in certain examples, all of the DOCSIS steps. After the desired IP connectivity steps are determined, a notification is sent to the CMTS 15 indicating which connectivity steps are desired for use in reestablishing IP connectivity.

Prior to establishment (or reestablishment) of IP connectivity, one or more ranging requests (e.g., a Ranging Request (RNG-REQ), an Initial Ranging Request (INIT-RNG-REQ), or a Bonded Initial Ranging Request (B-INIT-RNG-REQ)) are sent from cable modem 30(1) to CMTS 15. Techniques described herein add a new encoding to these requests to serve as the notification from cable modem 30(1) to CMTS 15 indicating which of the IP connectivity steps should be skipped during reestablishment of IP connectivity. More specifically, RNG-REQ, INIT-RNG-REQ and B-INIT-RNG-REQ each contain a 16-bit field whose lower 14 bits encode the service identifier (SID), leaving two bits for use in identifying the desired IP connectivity steps. Furthermore, B-INIT-RNG-REQ also contains an 8-bit field whose upper 2 bits encode various cable modem capabilities, leaving an additional 6 available bits for use in identifying the desired IP connectivity steps. As such, these two approaches use reserve bits that currently exist in the ranging requests as the notification to CMTS 15. In an alternative arrangement, a new 8-bit field may be appended to RNG-REQ, INIT-RNG-REQ and B-INIT-RNG-REQ for use in identifying the desired IP connectivity steps. In accordance with certain techniques described herein, CMTS 15 is configured to accept initial ranging requests with the new encoding and requests without the new encoding.

The cable modem 30(1) is configured to make one of several determinations, and the encoding is configured to convey each of these determinations to CMTS 15. More particularly, in accordance with DOCSIS, the cable modem 30(1) is configured to make one of the following determinations for reestablishing connectivity: (1) perform a full tri-step IP connectivity establishment (i.e., acquire an IP address, current date and time, and a configuration file); (2) skip acquisition of the IP address (i.e., reuse the IP address previously assigned), but acquire the current time/date and the configuration file; (3) skip acquisition of the IP address and the current date and time, but obtain a new configuration file; (4) skip acquisition of the IP address and the configuration file, but obtain the current time/date; or (5) skip all three IP connectivity steps and proceed directly to registration. In certain examples described herein, acquiring the current time/date or the configuration file generally cannot be skipped without first skipping acquisition of the IP address because the new IP address may result in new time/dates and/or configuration file settings.

When the notification (i.e., encoding ranging request message) is received by CMTS 15, connectivity evaluation module 20 determines if the desired connectivity steps selected by connectivity determination module 35(1) may be used to reestablish IP connectivity. That is, as detailed further below, connectivity evaluation module 20 evaluates the selected steps to determine if execution of those steps will result in correct reestablishment of IP connectivity (i.e., will not disrupt provisioned service or introduce security risks). After this evaluation, a notification or message is sent to cable modem 30(1) indicating if the desired connectivity steps may be used in reestablishing IP connectivity. In certain examples, this notification may further identify any additional connectivity steps to be used in reestablishing IP connectivity.

More specifically, when a CMTS, such as CMTS 15, receives a ranging request from a cable modem, such as cable modem 30(1), the CMTS responds to (acknowledges) the request with a ranging response (RNG-RSP). As such, the indication of whether the desired IP connectivity steps may be used is encoded in this ranging response in substantially the same manner as described above for the ranging requests. For example, a new type-length-value (TLV) element may be encoded in the ranging response. Regardless of the format, in accordance with the above example, the encoding may reflect whether the cable modem should, or is permitted to, (1) perform a full tri-step IP connectivity establishment (i.e., acquire an IP address, current date and time, and a configuration file); (2) skip acquisition of the IP address, but acquire the current time/date and the configuration file; (3) skip acquisition of the IP address and the current date and time, but obtain a new configuration file; (4) skip acquisition of the IP address and the configuration file, but obtain the current time/date; or (5) skip all three IP connectivity steps and proceed directly to registration. In accordance with certain techniques described herein, cable modem 30(1) is configured to accept ranging responses with the new encoding and responses without the new encoding.

As noted above, in the example of FIG. 1, cable modem 30(1) may make one of five (5) different determinations and the encoding ($E_{CM}$) in the ranging requests, as well as the encoding ($E_{CMTS}$) in the ranging responses, are configured to identify these five different determinations. That is, as shown below in Table 1, $E_{CM}$ or $E_{CMTS}$ may be able to take on five different states.

TABLE 1

| $E_{CM}$/ $E_{CMTS}$ | Skip IP Address Acquisition | Skip Current Time/Date Acquisition | Skip Configuration File Acquisition |
|---|---|---|---|
| 0 | N | N | N |
| 1 | Y | N | N |
| 2 | Y | Y | N |
| 3 | Y | N | Y |
| 4 | Y | Y | Y |

It is to be appreciated that the five possible states of Table 1 are merely illustrative, and that other numbers of states, and determinations by cable modem 30(1), may be used in different arrangements. Additionally, the numbers of Table 1 are merely used for illustration and do not necessarily represent the binary encoding in the ranging requests or ranging responses.

After receiving the notification (ranging response) from CMTS 15, cable modem 30(1) reestablishes IP connectivity using the desired connectivity steps and, optionally, any additional steps identified in the notification from CMTS 15.

Figure 2:
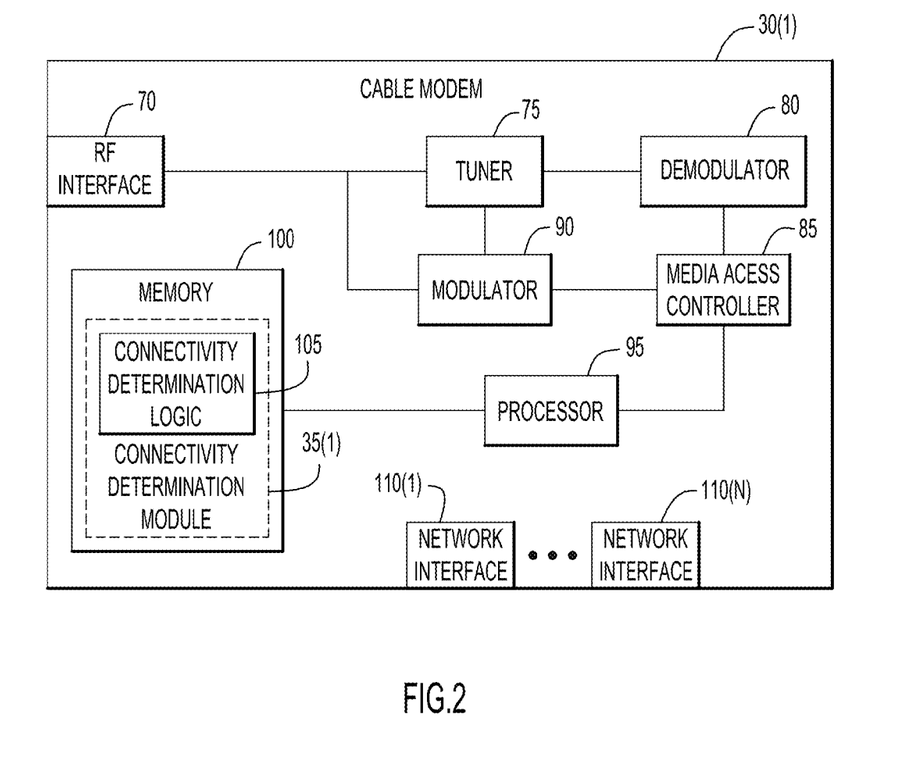
FIG. 2 is a block diagram of an example cable modem configured for selective reestablishment of IP connectivity with the CMTS.

FIG. 2 is a block diagram of one example configuration of cable modem 30(1) of FIG. 1. As shown, cable modem 30(1) comprises a radio-frequency (RF) interface 70, a tuner 75, a demodulator 80, a media access controller 85, a modulator 90, a processor 95, and a memory 100 that includes connectivity determination logic 105. Cable modem 30(1) also comprises a plurality of network interfaces 110(1)-110(N).

As previously noted, cable modem 30(1) is connected to CMTS 15 via a coaxial cable 50 that carries cable television signals and Internet traffic. Disposed between CMTS 15 and cable modem 30(1) is a one-to-two splitter (not shown in FIG. 2) that separates the cable television signals from the Internet traffic. The cable television signals are forwarded to a cable television Set Top Box (STB) (not shown in FIG. 2), while the Internet traffic is forwarded to cable modem 30(1). RF interface 70 comprises a cable outlet that is configured to couple to a coaxial cable.

Tuner 75, which is connected to RF interface 70, is configured to forward the modulated RF signals to demodulator 80. In certain circumstances, tuner 75 includes a diplexer (not shown in FIG. 2) that enables the tuner to make use of one set of frequencies (e.g., between approximately 42 MHz and approximately 850 MHz) for downstream traffic, and another set of frequencies (e.g., between approximately 5 and approximately 42 MHz) for upstream traffic.

Demodulator 80 may be, for example, a quadrature amplitude modulation (QAM) demodulator configured to extract the transmitted information from the received RF signals. The extracted information may then be forwarded to computers 40(1) and 40(2) (FIG. 1) via network interfaces 110(1)-110(N) that enable communication over a network (local or wide area) and are, for example, Ethernet cards. As such, demodulator handles downstream traffic (i.e., traffic transmitted from CMTS 15 to cable modem 30(1)).

Upstream traffic (i.e., traffic transmitted from cable modem 30(1) to CMTS 15) is handled by modulator 90. More specifically, modulator 90 is, for example, a QAM modulator configured to convert the digital computer network data received from computers 40(1) and 40(2) (via network interfaces 110(1)-110(N)) into RF signals for transmission via coaxial cable 50. Demodulator 80 and modulator 90 may each be implemented in hardware, software or combinations thereof.

MAC 85 comprises hardware, software, or a combination thereof, and is disposed between the upstream and downstream portions of cable modem 30(1) (i.e., between demodulator 80 and modulator 90). MAC 85 functions as the interface between the hardware and software portions of the various network protocols.

Processor 95 generally operates to manage system issues of cable modem 30(1). However, the exact operations of processor 95 may depend on, for example, whether cable modem 30(1) is designed to be part of a larger computer system or to provide Internet access with no additional computer support. In certain situations, processor 95 may perform some portion of the MAC functionality.

As noted above with reference to FIG. 1, cable modem 30(1) includes a connectivity determination module 35(1) that, as noted above, is configured to determine which IP connectivity steps are desired for use in reestablishing IP connectivity with CMTS 15. FIG. 2 illustrates an example software implementation of connectivity determination module 35(1). That is, as shown, connectivity determination module 35(1) comprises connectivity determination logic 105 stored in memory 100 that may comprise read only memory (ROM), random access memory (RAM), magnetic disk storage media devices, optical storage media devices, flash memory devices, electrical, optical, or other physical/tangible memory storage devices. The processor 95 is, for example, a microprocessor or microcontroller that executes instructions for the connectivity determination logic 105. Thus, in general, the memory 100 may comprise one or more tangible computer readable storage media (e.g., a memory device) encoded with software comprising computer executable instructions and when the software is executed (by the processor 95) it is operable to perform the operations described herein in connection with connectivity determination logic 105.

It is to be appreciated that the software implementation of connectivity determination module 35(1) of FIG. 2 is merely illustrative, and that other implementations are possible. For example, in an alternative arrangement, connectivity determination logic 105 may be implemented as hardware elements, such as digital logic gates in one or more application-specific integrated circuits (ASICS).

Returning to the example of FIG. 2, when IP connectivity between the cable modem 30(1) and the CMTS 15 is terminated (i.e., the cable modem drops off-line), cable modem 30(1) is configured to determine which IP connectivity steps (e.g., acquisition of the IP address, the current date and time, and the configuration file) should be used to reestablish IP connectivity with CMTS 15. This determination is made by processor 95 through the execution of connectivity determination logic 105. The details of such determinations are provided below. After the determination is complete, cable modem 30(1) generates and sends a message (via coaxial cable 50) to CMTS 15 identifying the desired steps.

Figure 3:
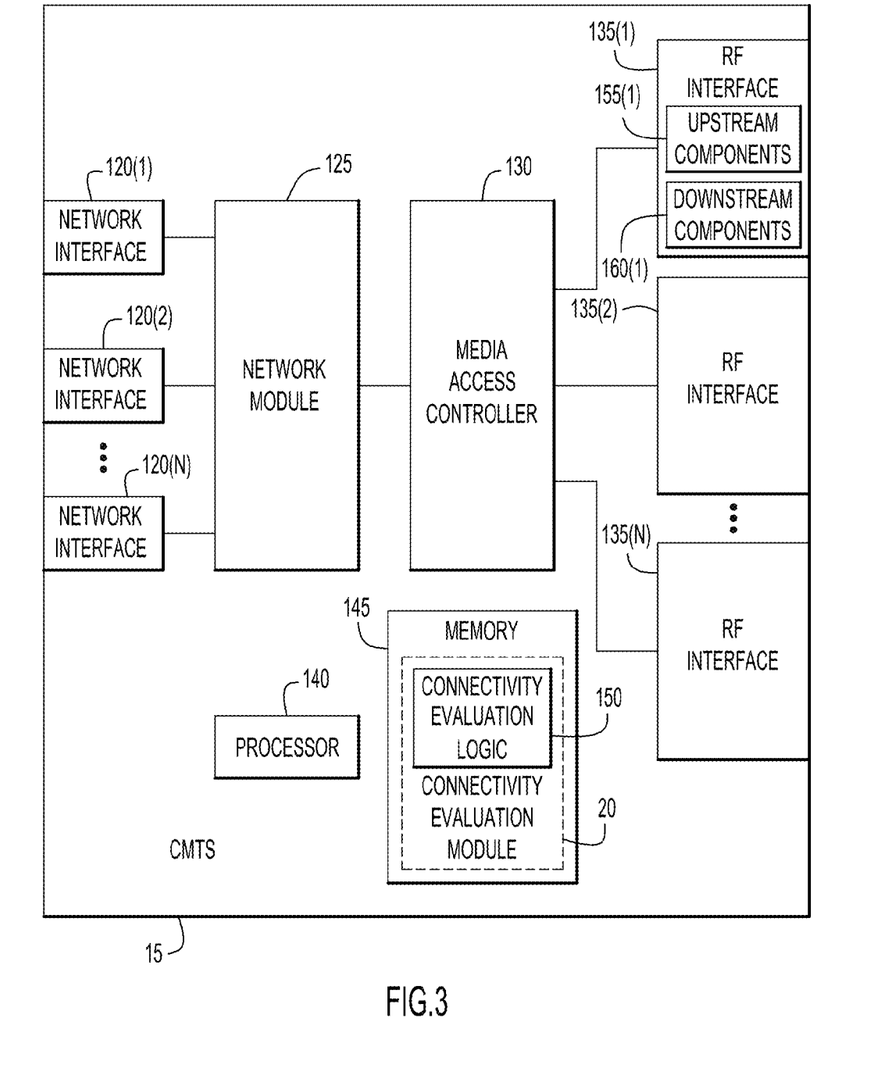
FIG. 3 is a block diagram of the CMTS configured for selective reestablishment of IP connectivity with the cable modem.

FIG. 3 is a block diagram of one example configuration of CMTS 15 of FIG. 1. As shown, CMTS 15 comprises a plurality of network interfaces 120(1)-120(N), a network module 125, a media access controller (MAC) 130, a plurality of radio-frequency (RF) interfaces 135(1)-135(N), a processor 140, and memory 145 that includes connectivity evaluation logic 150.

Generally, network module 125 interfaces with MAC 130 to transmit information between the two modules. Processor 140 is generally configured to manage bandwidth processing, and is in communication with both MAC 130 and network module 125 via, for example, a Peripheral Component Interconnect (PCI) bus (not shown in FIG. 3).

MAC 130 comprises hardware, software, or a combination thereof and is configured to interface with the plurality of RF interfaces 135(1)-135(N) for transmission of RF signals to cable modems 30(1)-30(N). RF interfaces 135(1)-135(N) are upstream/downstream physical layer interfaces (PHYs) each configured for connection to a coaxial cable, such as coaxial cables 50 of FIG. 1. More specifically, RF interfaces 135(1)-135(N) include upstream PHY components 155(1)-155(N) and downstream PHY components 160(1)-160(N), which collectively operate to interface with RF circuitry. For ease of illustration, only the details of RF interface 135(1) are shown in FIG. 3 and, as such, only RF interface 135(1) will be described in detail.

The upstream PHY components 155(1) operate to receive RF signals from cable modem 30(1), and as such, the upstream PHY components 155(1) operate as a demodulator. The downstream PHY components 160(1) operate to transmit RF signals from CMTS 15 to cable modem 30(1), and, because the signals on coaxial cable 50 are modulated signals (e.g., RF signals), the downstream PHY components 160(1) operate as a modulator.

MAC 130 operates to prepare packets for transmission to cable modems 30(1)-30(N) and to prepare packets received from the cable modems for use by network module 125. The packet preparation may include, for example, encryption, decryption, suppression, expansion, concatenation, fragmentation, multiplexing, demultiplexing, etc., depending on the desired configuration of CMTS 15 and the related components.

Network interfaces 120(1)-120(N) connect CMTS 15 with an external network, such as the Internet 45 of FIG. 1. Network module 125 receives packets from MAC 130, and prepares the packets for forwarding to the Internet 45 via interfaces 120(1)-120(N). Similarly, network module 125 receives packets from the Internet 45 (via interfaces 120(1)-120(N)) and prepares these received packets for use by MAC 130. The packet preparation by network module 125 may include, for example, rate shaping, bandwidth limiting, priority queuing, etc., depending on the desired configuration of CMTS 15 and the related components.

Processor 140 generally operates to manage system issues of CMTS 15, and in this particular example, all DOCSIS system issues such as scheduling, provisioning, accounting, configuring, etc. As noted above with reference to FIG. 1, CMTS 15 includes a connectivity evaluation module 20 that is configured to evaluate IP connectivity steps desired by a cable modem, such as cable modem 30(1). FIG. 3 illustrates an example software implementation of connectivity evaluation module 20. That is, as shown, connectivity evaluation module 20 comprises connectivity evaluation logic 150 stored in memory 145 that may comprise ROM, RAM, magnetic disk storage media devices, optical storage media devices, flash memory devices, electrical, optical, or other physical/tangible memory storage devices. The processor 140 is, for example, a microprocessor or microcontroller that executes instructions for the connectivity evaluation logic 150. Thus, in general, the memory 145 may comprise one or more tangible computer readable storage media (e.g., a memory device) encoded with software comprising computer executable instructions and when the software is executed (by the processor 140) it is operable to perform the operations described herein in connection with connectivity evaluation logic 150.

It is to be appreciated that the software implementation of connectivity evaluation module 20 of FIG. 3 is merely illustrative, and that other implementations are possible. For example, in an alternative arrangement, connectivity evaluation logic 150 may be implemented as hardware elements, such as digital logic gates in one or more application-specific integrated circuits (ASICS).

Returning to the example of FIG. 3, when IP connectivity between the cable modem 30(1) and the CMTS 15 is lost (i.e., the cable modem drops off-line), CMTS 15 receives a message or notification (via RF interface 135(1)) from the cable modem 30(1) which identifies desired connectivity steps for use in reestablishing IP connectivity. The desired IP connectivity steps identified in this message are then evaluated by processor 140 through the execution of connectivity evaluation logic 150. Details of this evaluation are provided below.

After the evaluation is complete, CMTS 15 generates and sends a message (via coaxial cable 50) to cable modem 30(1) indicating if the desired steps may be used to reestablish IP connectivity. If the desired steps are not satisfactory (i.e., will result in cable modem 30(1) having incorrect data), the message from CMTS 15 will further identify any additional steps that should be executed to reestablish IP connectivity.

Figure 4A:
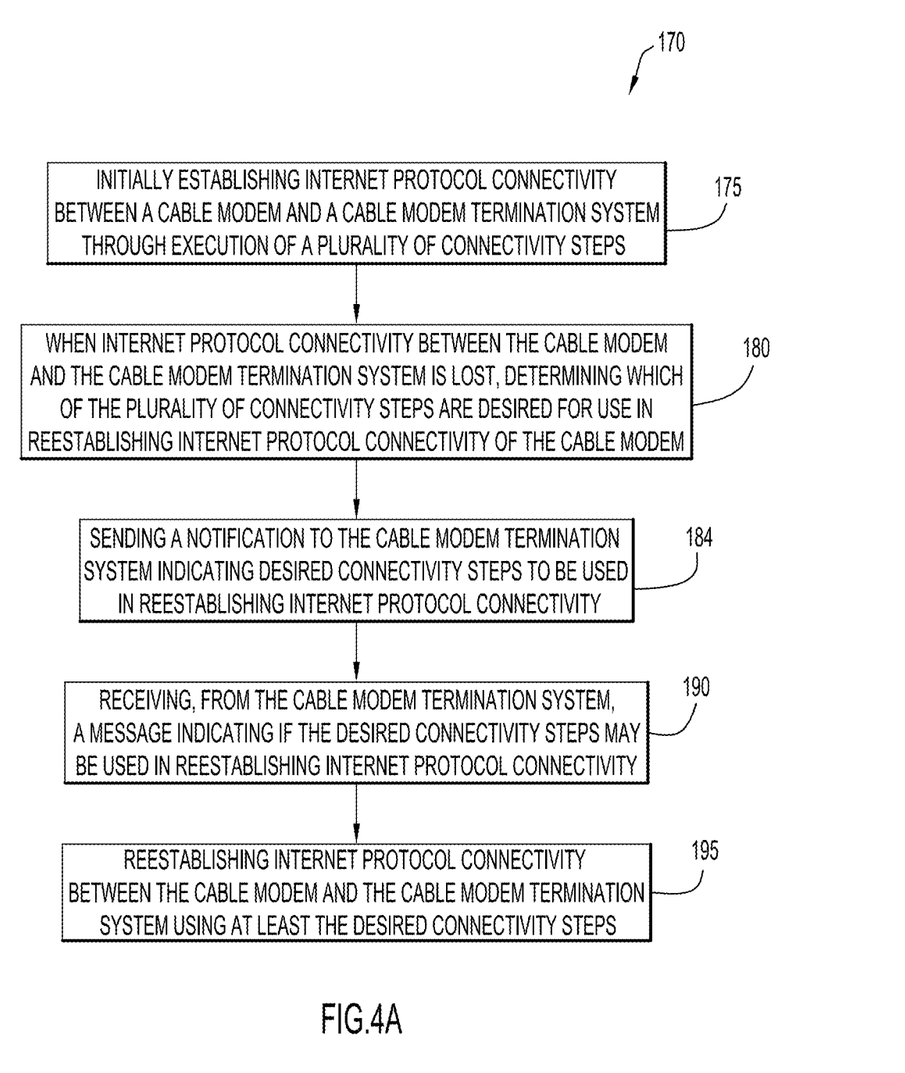
FIG. 4A is a high level flowchart of an example method performed by the cable modem during selective reestablishment of IP connectivity.

FIG. 4A is a high level flowchart of an example method 170 performed by cable modem 30(1) for selective reestablishment of IP connectivity with CMTS 15. Method 170 begins at 175 where IP connectivity between cable modem and CMTS 15 is initially established through execution or performing of a plurality of connectivity steps. At 180, when IP connectivity between cable modem 30(1) and CMTS 15 is lost (terminated), the cable modem determines which of the plurality of connectivity steps are desired for use in reestablishing IP connectivity with the CMTS. That is, cable modem 30(1) is configured to select which of the initial IP connectivity steps (i.e., acquisition of an IP address, current date and time, and a configuration file) are to be repeated during reestablishment of IP connectivity, and which of these steps may be selectivity skipped. At 185, cable modem 30(1) sends a notification to CMTS 15 indicating the desired connectivity steps to be used in reestablishing IP connectivity. At 190, a message is received from CMTS 15 indicating if the desired connectivity steps may be used in reestablishing IP connectivity, and, at 195, IP connectivity between cable modem 30(1) and CMTS 15 is reestablished using at least the desired connectivity steps.

Figure 4B:
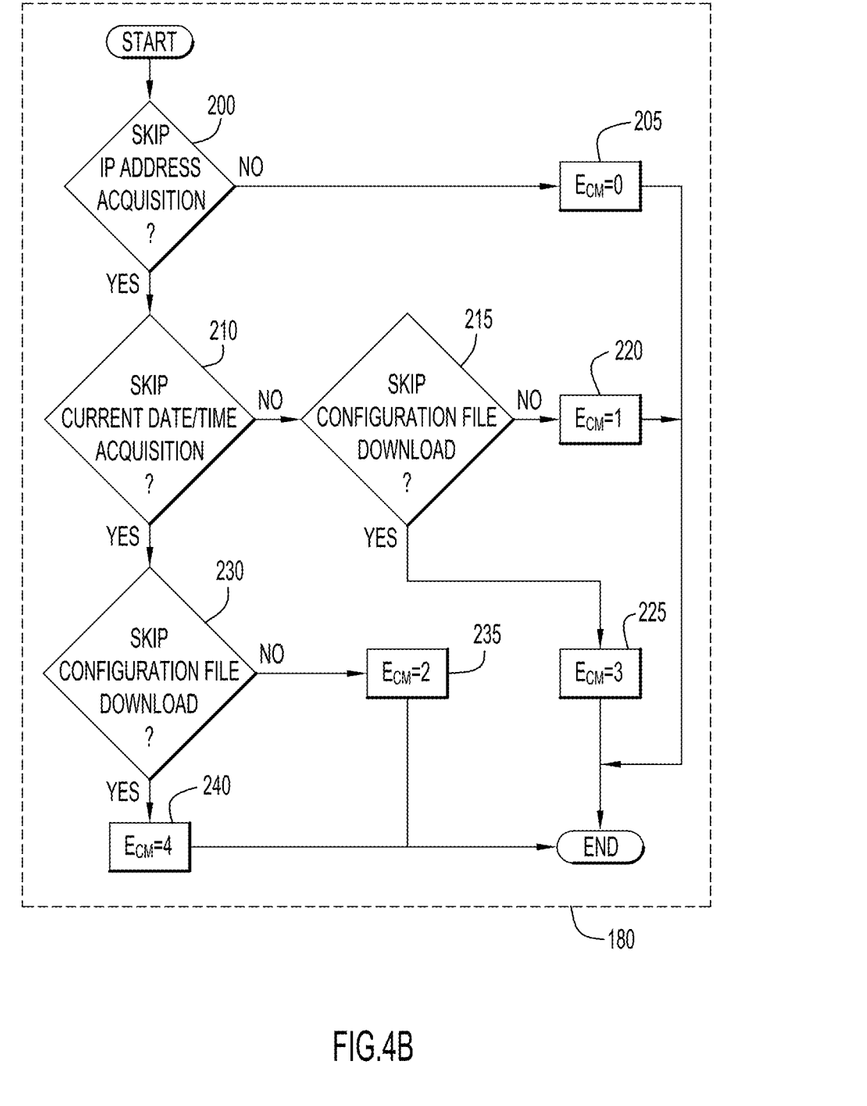
FIG. 4B is a detailed flowchart of an example method performed by the cable modem during to determine the desire steps for reestablishing IP connectivity.

FIG. 4B is a detailed flowchart of the operations performed at 180 of FIG. 4A for determining if any of the initial IP connectivity steps may be selectivity skipped during reestablishment of IP connectivity between cable modem 30(1) and CMTS 15. More particularly, a determination is made at 200 as to whether acquisition of the IP address for cable modem 30(1) should be skipped. Cable modem 30(1) may be configured to monitor the lease time of the last received IP address. If the lease time for the last IP address has not expired before cable modem 30(1) comes back online, the cable modem may use the last received IP address (stored in memory of the cable modem) and acquisition of the IP address may be skipped during reestablishing IP connectivity. If it is determined at 200 that the IP address acquisition should not be skipped (e.g., the lease has previously expired), then at 205 the encoding in the ranging request message(s) ($E_{CM}$) is set to zero (0). As shown in Table 1, an $E_{CM}=0$ means that cable modem 30(1) desires to acquire the IP address, current time/date, and the configuration file (i.e., no steps should be skipped). That is, a full three-step reestablishment of IP connectivity is desired by cable modem 30(1).

If, at 200, it is determined that acquisition of the IP address should be skipped, at 210, a determination is made as to whether acquisition of the current time/date should be skipped. As previously noted, acquisition of the current time/date is generally an optional step that may be omitted as desired and the cable modem may operate from its internal clock. However, as noted above, if a prior IP address is re-used, the prior received time/date corresponding to the prior IP address is also re-used. Cable modem 30(1) may decide to acquire a new time/date when, for example, the cable modem has lost track of its internal clock (e.g., the internal battery has run out of charge).

If it is determined at 210 that acquisition of the current time/date should not be skipped, then at 215 a determination is made as to whether download or acquisition of a new configuration file should be skipped. If download of the configuration file should not be skipped, the method proceeds to 220 where $E_{CM}$ is set to one (1). As shown in Table 1, an $E_{CM}=1$ means that the cable modem desires to skip acquisition of the IP address, but to retain acquisition of the current time/date and download of the configuration file (i.e., these steps should not be skipped).

Returning to 215, if it is determined that the download of the new configuration file should be skipped, then at 225 $E_{CM}$ is set to three (3). As shown in Table 1, an $E_{CM}=3$ means that the cable modem desires to skip acquisition of the IP address and download of the configuration file, but to retain acquisition of the current time/date (i.e., these steps should not be skipped). In this case, the previously received configuration file (stored in the cable modem's memory) may be re-used.

Returning to 210, if it is determined that acquisition of the current time/date should be skipped, then at 230 a determination is made as to whether download of the configuration file should also be skipped. If download of the configuration file should not be skipped, then at 235 $E_{CM}$ is set to two (2). As shown in Table 1, an $E_{CM}=2$ means that the cable modem desires to skip acquisition of the IP address and acquisition of the current time/date, but to retain download of the configuration (i.e., this step should not be skipped).

If, at 230, it is determined that download of the configuration file should be skipped, then at 240 $E_{CM}$ is set to four (4). As shown in Table 1, an $E_{CM}=4$ means that the cable modem desires to skip acquisition of the IP address, acquisition of the current time/date, and download of the configuration file (i.e., all three steps should be skipped). In this case, cable modem will use the parameters (IP address, time/date, and configuration file) previously stored in memory following an earlier establishment of IP connectivity.

Figure 4C:
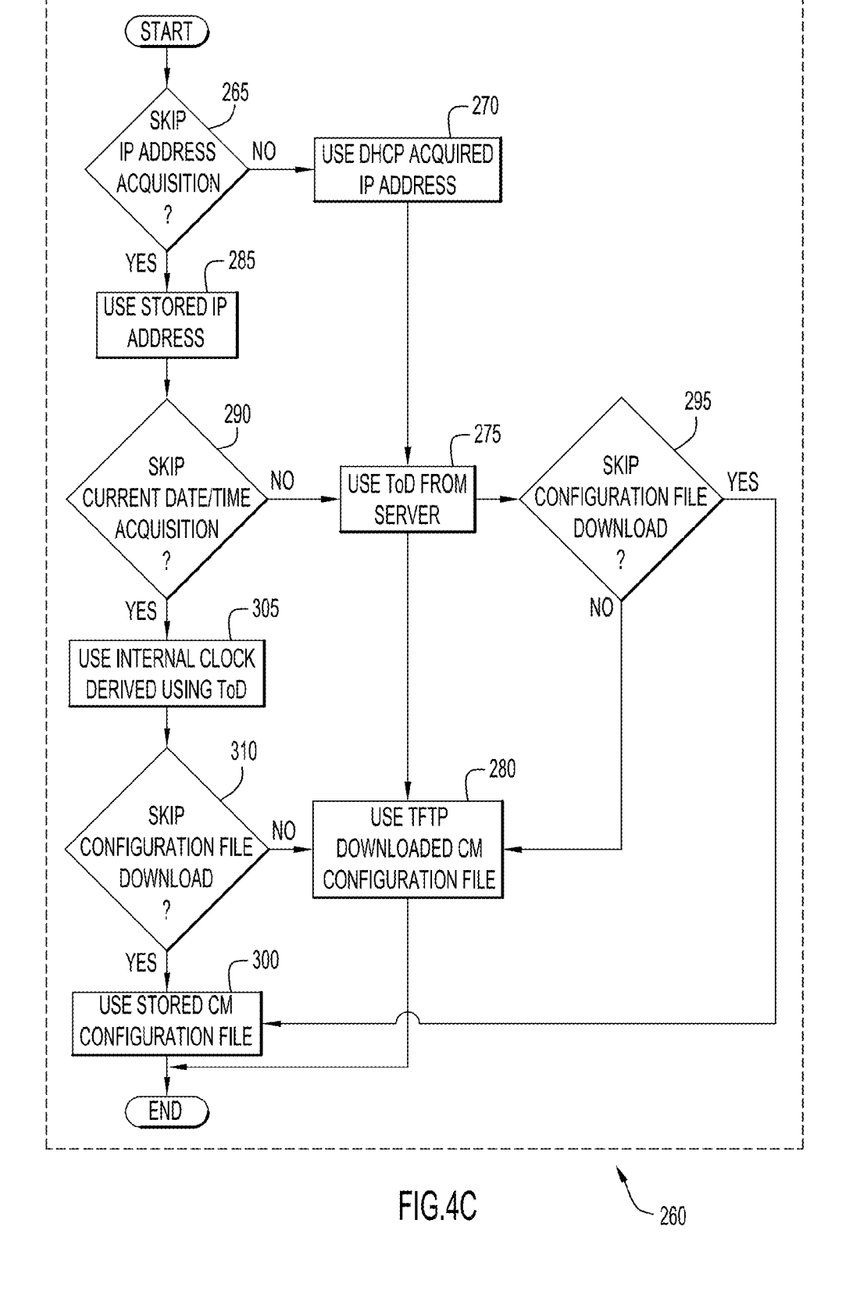
FIG. 4C is a detailed flowchart of another example method performed by the cable modem for implementing the desired steps for reestablishing IP connectivity.

FIG. 4C is a detailed flowchart of an example method 260 performed at 195 of FIG. 4A for reestablishing IP connectivity between cable modem 30(1) and CMTS 15. As noted above, a message is received from CMTS 15 indicating if the desired steps may be used in reestablishing IP connectivity and, in certain circumstances, indicating what other step(s) should be executed. In one example, the operations of FIG. 4C occur subsequent to receipt of this message from CMTS 15.

At 265, a determination is made as to whether the message from CMTS 15 indicates if acquisition of the IP address may be skipped. If acquisition of the IP address cannot be skipped, cable modem 30(1) proceeds to reestablish IP connectivity through a full tri-step process. This includes acquiring the IP address using, for example, DHCP at 270, acquiring the current time/date using, for example, ToD protocol at 275, and downloading a new configuration file using, for example, TFTP at 280.

Returning to 265, if it is determined that acquisition of the IP address can be skipped, method 260 proceeds to 285 where the prior received IP address, which was earlier stored in memory by cable modem 30(1), is used. Next, method 260 proceeds to 290 where a determination is made as to whether the message from CMTS 15 indicates if acquisition of the time/date may be skipped.

If the steps for acquisition of the current time/date cannot be skipped, method 260 proceeds to 275 where the current time/date are downloaded using, for example, the ToD protocol. Next, a determination is made at 295 as whether the message from CMTS 15 indicates if download of the configuration file may also be skipped. If download of the configuration file may be skipped, method 260 proceeds to 300 where the prior received configuration file, which was stored in memory by cable modem 30(1), is used. However, if, at 295, download of the configuration file may not be skipped, method 260 proceeds to 280 wherein the configuration file is downloaded using, for example, TFTP.

Returning to 290, if it is determined that acquisition of the current time/date may be skipped, method 260 proceeds to 305 wherein the internal clock of cable modem 30(1) is used to derive the current time/date. Method 260 then proceeds to 310 where a determination is made as to whether the message from CMTS 15 indicates if download of the configuration file may be skipped. If these step(s) may be skipped, method 260 proceeds to 300 where the stored configuration file is used. However, if these step(s) may not be skipped, method 260 proceeds to 280 where a new configuration file is downloaded, as described above.

Figure 5A:
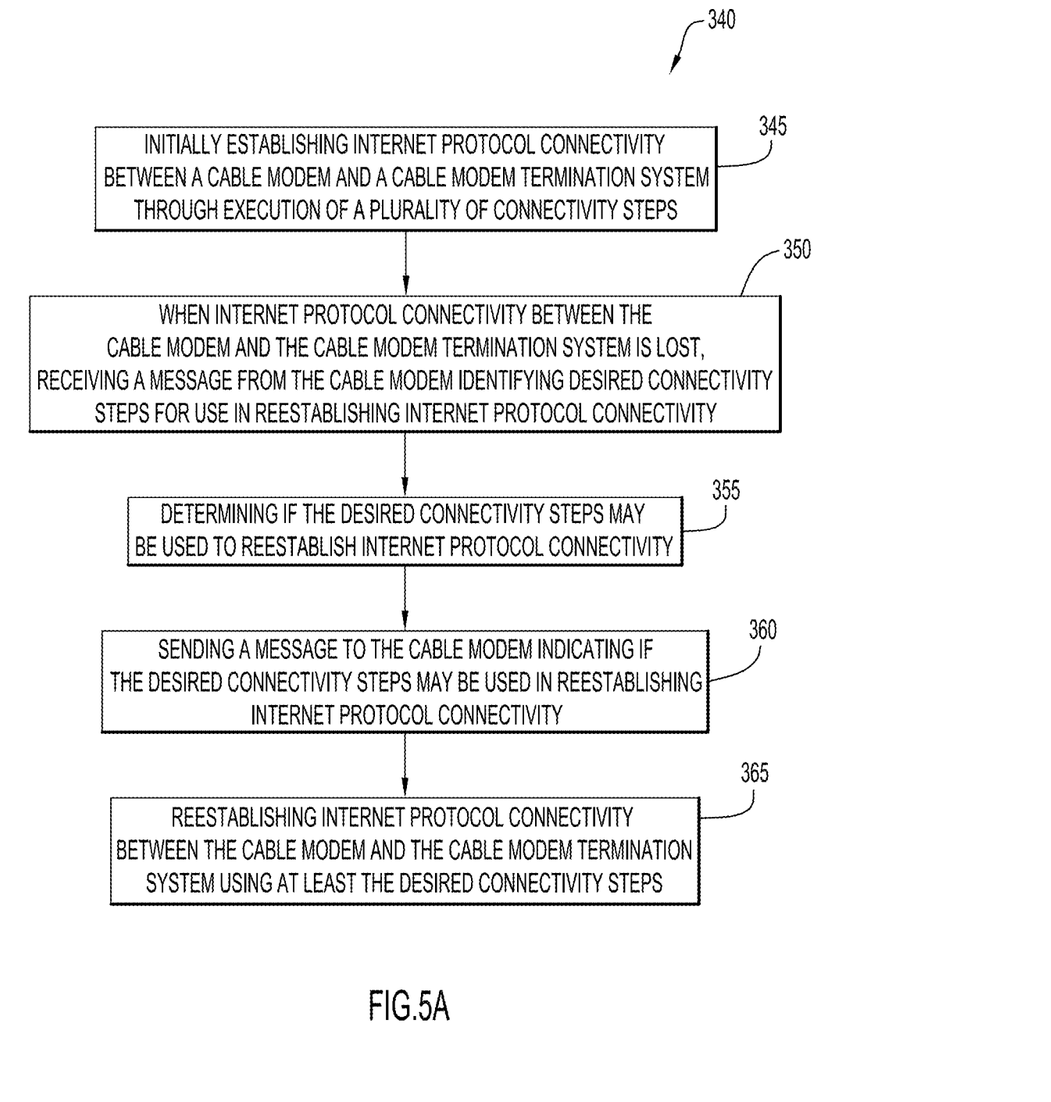
FIG. 5A is a high level flowchart of an example method performed by the CMTS during selective reestablishment of IP connectivity.

FIG. 5A is a high level flowchart of an example method 340 performed by CMTS 15 during selective reestablishment of IP connectivity with cable modem 30(1). At 345, IP connectivity between cable modem 30(1) and CMTS 15 is established through execution of a plurality of connectivity steps. In one example, the steps at 345 may include, for example, forwarding an IP address to the cable modem, forwarding a current time/date to the cable modem, and forwarding a configuration file to the cable modem. At 350, when IP connectivity between cable modem 30(1) and CMTS is lost (terminated), CMTS 15 receives a notification (e.g., encoded ranging requests) from cable modem 30(1) that identify desired connectivity steps to be used in reestablishing IP connectivity. That is, the received message identifies the steps that cable modem 30(1) wishes to use in reestablishing internet connectivity. At 355, CMTS 15 determines if the desired connectivity steps (identified in the received message) may be used to reestablish IP connectivity and, at 360, CMTS 15 sends a message (e.g., encoded ranging response) to cable modem 30(1) indicating if the desired connectivity steps may be used in reestablishing IP connectivity. At 365, IP connectivity between cable modem 30(1) and CMTS 15 is reestablished using at least the desired connectivity steps. The steps at 365 may include, for example, any one or more of forwarding an IP address to cable modem 30(1), forwarding a current time/date to cable modem 30(1), and/or forwarding a configuration file to cable modem 30(1).

Figure 5B:
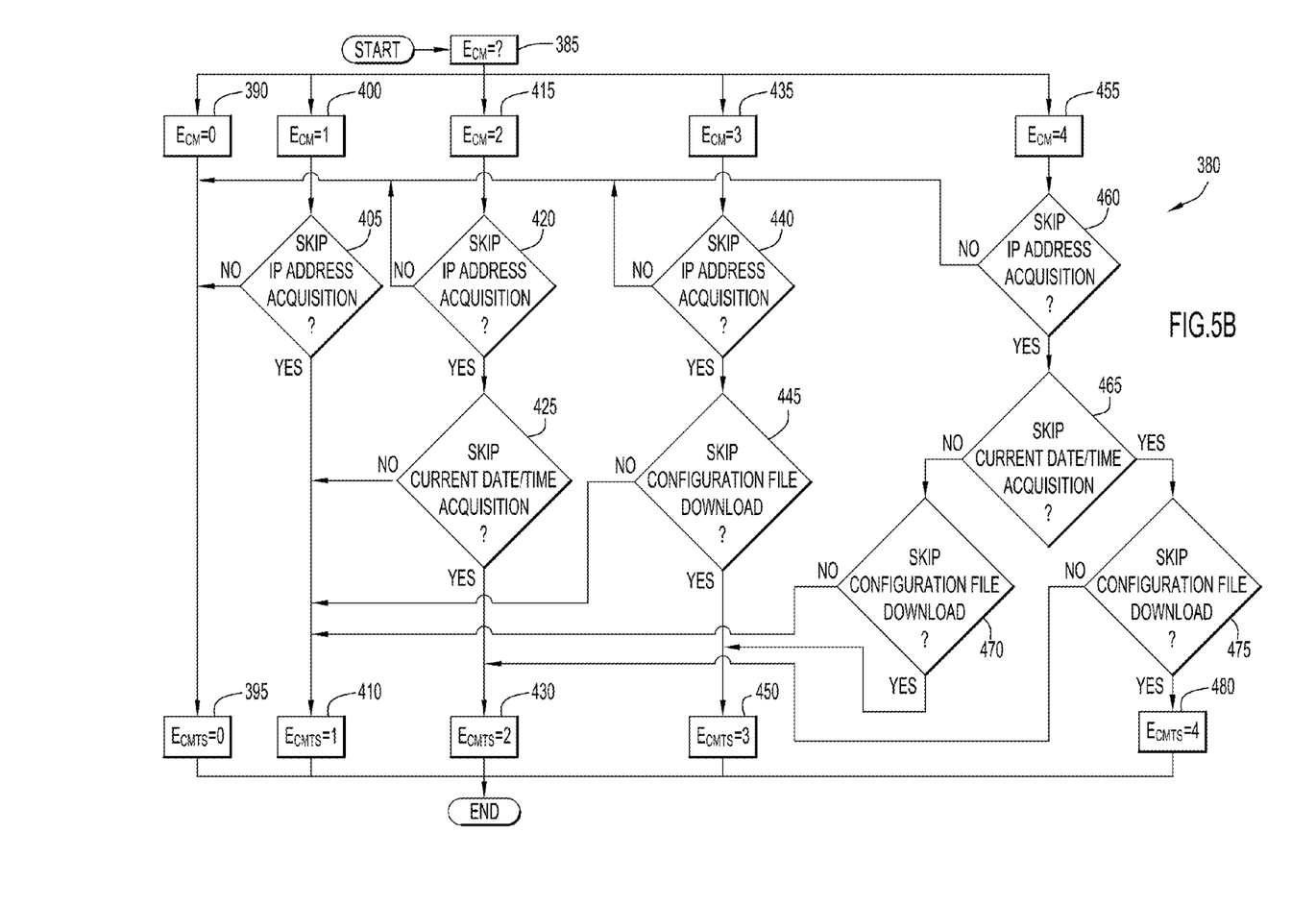
FIG. 5B is a detailed flowchart of an example method performed by the CMTS during selective reestablishment of IP connectivity.

FIG. 5B is a detailed flowchart of an example method 380 performed by CMTS 15 after an encoded ranging request is received from cable modem 30(1). More specifically, FIG. 5B illustrations operations of 355 of FIG. 5A where, as noted above, CMTS 15 determines if the steps desired by cable modem 30(1) may be used to reestablish IP connectivity. That is, the IP connectivity steps desired for use by cable modem 30(1) are evaluated to determine which steps can be safely omitted without, for example, disrupting provisioned service or introducing security risks. More generally, if it can be predicted that the cable modem will get the same results with or without skipping a step, then CMTS determines that the step can be omitted.

At 385, the encoding ($E_{CM}$) in the ranging request is evaluated to determine which IP connectivity steps are desired by cable modem 30(1). If $E_{CM}=0$ (represented by 390 in FIG. 5B) it is determined that cable modem 30(1) desires to perform a full tri-step reestablishment of IP connectivity (i.e., acquire the IP address, current time/date, and configuration file). As such, no further determinations are required by CMTS 15, and method 380 proceeds to 395 where the encoding for the ranging response message ($E_{CMTS}$) is set to 0, meaning that all three steps should be performed in reestablishing IP connectivity.

Returning to 385, if $E_{CM}=1$ (represented by 400 in FIG. 5B), it is determined that cable modem 30(1) desires to skip acquisition of the IP address, but perform acquisition of the current time/date and configuration file download. As such, in this example, method 380 proceeds to 405 wherein CMTS 15 determines if download of the IP address may be skipped. In operation, the IP addresses are configured on CMTS 15, and, as such, a change in an IP address for cable modem 30(1) is readily detected by the CMTS. As such, if, during evaluation of the desired IP connectivity steps, an IP address change is detected, CMTS 15 will retain acquisition of the IP address for cable modems whose last successful registration happened prior to the new IP address assignment. For cable modems that came online after the IP address change, IP address acquisition can still be skipped if they drop offline and try to come back online in the future. Additionally, CMTS 15 can track the last time an individual cable modem was offered an IP address. If a cable modem's last lease has expired, but tries to come back online using a prior IP address, CMTS 15 is configured to instruct the cable modem to perform the IP address acquisition. Furthermore, techniques described herein may use an operator's manual configuration to tell the CMTS about a configuration change affecting IP addresses. For example, whenever a change is scheduled that will affect the IP address of a cable modem, an operator may inform CMTS 15 of the changes so that the CMTS can properly evaluate the requests from the cable modems.

If acquisition of the IP address cannot be skipped, method 380 proceeds to 395 where $E_{CMTS}$ is set to 0, meaning that all three steps should be performed in reestablishing IP connectivity. This is because, as noted above, if acquisition of the IP address cannot be skipped, the other steps should not be skipped. If, at 405, it is determined that acquisition of the IP address may be skipped, method 380 proceeds to 410 where $E_{CMTS}$ is set to 1, meaning that the IP address acquisition may be skipped, as desired by cable modem 30(1).

Returning to 385, if $E_{CM}=2$ (represented by 415 in FIG. 5B), it is determined that cable modem 30(1) desires to skip acquisition of the IP address and acquisition of the current time/date, but desires to perform the configuration file download. As such, in this example, method 380 proceeds to 420 where CMTS 15 determines if acquisition of the IP address can be skipped. If acquisition of the IP address cannot be skipped, method 380 proceeds to 395 where $E_{CMTS}$ is set to 0, meaning that all three steps should be performed in reestablishing IP connectivity. However, if, at 420, it is determined that acquisition of the IP address may be skipped, method 380 proceeds to 425 where a determination is made as to whether acquisition of the current time/date may be skipped. CMTS 15 is configured to detect, for example, a time change (e.g., transition from daylight savings time to daylight time). If a time change is detected, and CMTS 15 determines that the cable modem's last successful registration happened prior to the new change, CMTS 15 indicates to cable modem 30(1) that the steps for acquisition of the current time/date should be retained. For cable modems that last registered subsequent to the time change, CMTS 15 may indicate that acquisition of the current time/date may be skipped by the cable modem.

If, at 425, it is determined that acquisition of the current time/date may not be skipped, method 380 proceeds to 410 where $E_{CMTS}$ is set to 1, meaning that only the IP address acquisition may be skipped. However, if acquisition of the current time/date may be skipped, method 380 proceeds to 430 where $E_{CMTS}$ is set to 2, meaning that acquisition of the IP address and the current time/date may be skipped, as desired by cable modem 30(1).

Returning to 385, if $E_{CM}=3$ (shown at 435 in FIG. 5B), it is determined that cable modem 30(1) desires to skip acquisition of the IP address and configuration file download, but to perform acquisition of the current time/date. As such, in this example, method 380 proceeds to 440 where CMTS 15 determines if acquisition of the IP address can be skipped. If acquisition of the IP address cannot be skipped, method 380 proceeds to 395 where $E_{CMTS}$ is set to 0, meaning that all three steps should be performed in reestablishing IP connectivity. However, if, at 440, it is determined that acquisition of the IP address may be skipped, method 380 proceeds to 445 where a determination is made as to whether download of the configuration file may be skipped. To evaluate a desire to skip download of the configuration file, any change to the TFTP server address, or any configuration change to the TFTP server, may be identified by the CMTS. The TFTP server address can be obtained by CMTS 15 through examining DHCP transactions between cable modems and the DHCP server. Whenever a change is detected, the CMTS 15 may inform all cable modems that future reestablishment processes need to include download of a new configuration file. However, as DHCP transactions can be omitted, it is still possible that, after change to the TFTP server address, some cable modems still use a cached configuration file for registration. Until a protocol is developed to make CMTS 15 aware of any configuration change to TFTP servers, techniques described herein use an operator's manual configuration to configure the CMTS with the change.

If, at 445, it is determined that download of the configuration file may not be skipped, method 380 proceeds to 410 where $E_{CMTS}$ is set to 1, meaning that only the IP address acquisition may be skipped. However, if download of the configuration file may be skipped, method 380 proceeds to 450 where $E_{CMTS}$ is set to 3, meaning that acquisition of the IP address and download of the configuration file may be skipped, as desired by cable modem 30(1).

Returning to 385, if $E_{CM}$=4 (represented by 455 in FIG. 5B), it is determined that cable modem 30(1) desires to skip all three of the IP connectivity steps. As such, in this example, method 380 proceeds to 460 where CMTS 15 determines if acquisition of the IP address can be skipped. If acquisition of the IP address cannot be skipped, method 380 proceeds to 395 where $E_{CMTS}$ is set to 0, meaning that all three steps should be performed in reestablishing IP connectivity. However, if, at 460, it is determined that acquisition of the IP address may be skipped, method 380 proceeds to 465 where a determination is made as to whether acquisition of the current time/date may be skipped. If acquisition of the current date/time cannot be skipped, method 380 proceeds to 470 where a determination is made as to whether download of the configuration file may be skipped. If such download cannot be skipped, method 380 proceeds to 410 where $E_{CMTS}$ is set to 1, meaning that only the IP address acquisition may be skipped. If, at 470, it is determined that download of the configuration file may be skipped, method 380 proceeds to 450 where $E_{CMTS}$ is set to 3, meaning that acquisition of the IP address and for download of the configuration file may be skipped.

Returning to 465, if it is determined that acquisition of the current time/date can be skipped, method 380 proceeds to 475 where a determination is made as to whether download of the configuration file may be skipped. If download of the configuration file may not be skipped, method 380 proceeds to 430 where $E_{CMTS}$ is set to 2, meaning that only acquisition of the IP address and the current time/date may be skipped. If, at 475, it is determined that download of the configuration file may be skipped, method 380 proceeds to 480 where $E_{CMTS}$ is set to 4, meaning that all three of the connectivity steps may be skipped, as desired by cable modem 30(1).

Examples are described herein of several techniques for use by a cable modem and/or a CMTS to determine when/if an IP connectivity step may be skipped. It is to be appreciated that these techniques are merely examples and that other techniques may be performed. For example, end-users may consider other factors and configure the hardware/software accordingly.

Additionally, techniques described herein allow the cable modem and CMTS to automatically select which IP connectivity steps to use. In certain circumstances, an operator is allowed to manually force a cable modem or a CMTS to initiate a full, tri-step IP connectivity reestablishment. On the cable modem side, this could be provided by a reset button, or simply a power cycle. On the CMTS side, for cable modems that are already online, this could be provided by the addition of a "clear cable modem" command, or simply the existing "clear cable modem delete" command. For cable modems that may come online in the future, this could be provided by a global or interface level configuration command.

The above description is intended by way of example only.

What is claimed is:

1. A method comprising:
   initially establishing Internet Protocol connectivity between a cable modem and a cable modem termination system through execution of a plurality of connectivity steps;
   when Internet Protocol connectivity between the cable modem and the cable modem termination system is lost, evaluating, at the cable modem, information received by the cable modem during the initial establishment of Internet Protocol connectivity to determine whether any of the received information may be used for future operations;
   determining, at the cable modem based on the evaluating, to reuse an Internet Protocol address obtained when initially establishing the Internet Protocol connectivity and to skip a connectivity step of acquisition of the Internet Protocol address;
   determining selected one or more of the plurality of connectivity steps other than acquisition of the Internet Protocol address for use in reestablishing Internet Protocol connectivity of the cable modem;
   sending a message from the cable modem to the cable modem termination system, wherein the message is encoded to indicate that the connectivity step of acquisition of the Internet Protocol address is to be skipped and to identify the selected one or more connectivity steps other than acquisition of the Internet Protocol address determined by the cable modem for use in reestablishing Internet Protocol connectivity;
   receiving, from the cable modem termination system, a message indicating whether the connectivity step of acquisition of the Internet Protocol address may be skipped and that the selected one or more connectivity steps other than acquisition of the Internet Protocol address may be used in reestablishing Internet Protocol connectivity; and
   reestablishing Internet Protocol connectivity between the cable modem and the cable modem termination system using the Internet Protocol address obtained when initially establishing the Internet Protocol connectivity and the selected one or more connectivity steps other than acquisition of the Internet Protocol address.

2. The method of claim 1, wherein receiving the message indicating whether the connectivity step of acquisition of the Internet Protocol address may be skipped and the selected one or more connectivity steps other than acquisition of the Internet Protocol address may be used in reestablishing Internet Protocol connectivity further comprises:

receiving a message indicating that the selected one or more connectivity steps other than acquisition of the Internet Protocol address and one or more additional connectivity steps are to be used by the cable modem in reestablishing Internet Protocol connectivity with the cable modem termination system.

3. The method of claim 1, wherein determining the selected one or more connectivity steps other than acquisition of the Internet Protocol address for use in reestablishing Internet Protocol connectivity comprises:

determining that a subset of the plurality of connectivity steps other than acquisition of the Internet Protocol address are desired.

4. The method of claim 1, wherein the plurality of connectivity steps for initially establishing Internet Protocol connectivity comprise:

(a) obtaining the Internet Protocol address for the cable modem;
(b) obtaining a current date and time; and
(c) downloading a configuration file for the cable modem.

5. The method of claim 4, wherein determining the selected one or more connectivity steps other than acquisition of the Internet Protocol address for use in reestablishing Internet Protocol connectivity comprises:

determining that at least one of connectivity steps (b), or (c) is to be skipped during re-registration of the cable modem when reestablishing Internet Protocol connectivity.

6. The method of claim 4, wherein determining the selected one or more connectivity steps other than acquisition of the Internet Protocol address for use in reestablishment of the Internet Protocol connectivity comprises:

determining that connectivity steps (b), and (c) are to be performed during reestablishment of the Internet Protocol connectivity.

7. The method of claim 4, wherein determining to reuse the Internet Protocol address obtained when initially establishing the Internet Protocol connectivity and to skip the connectivity step of acquisition of the Internet Protocol address comprises:

determining that the Internet Protocol address received during initial establishment of the Internet Protocol connectivity is still valid.

8. The method of claim 7, further comprising:
determining that connectivity step (b) is also to be skipped during reestablishment of the Internet Protocol connectivity.

9. The method of claim 7, further comprising:
determining that a configuration file for the cable modem received during initial establishment of the Internet Protocol connectivity is not valid and that connectivity step (c) is to be performed during reestablishment of the Internet Protocol connectivity.

10. The method of claim 7, further comprising:
determining that connectivity steps (b) and (c) are both to be performed when reestablishing Internet Protocol connectivity.

11. The method of claim 1, wherein sending a message to the cable modem termination system indicating the connectivity step of acquisition of the Internet Protocol address to be skipped and the selected one or more connectivity steps other than acquisition of the Internet Protocol address for use in reestablishing Internet Protocol connectivity comprises:

sending an encoded ranging request.

12. A method comprising:

initially establishing Internet Protocol connectivity between a cable modem and a cable modem termination system through execution of a plurality of connectivity steps;

when Internet Protocol connectivity between the cable modem and the cable modem termination system is lost, receiving a message from the cable modem, wherein the message is encoded to indicate that the connectivity step of acquisition of the Internet Protocol address is to be skipped and to identify selected one or more of the plurality of connectivity steps other than acquisition of the Internet Protocol address for use in reestablishing Internet Protocol connectivity, wherein the selected one or more connectivity steps other than acquisition of the Internet Protocol address were identified by the cable modem by evaluating information received by the cable modem during the initial establishment of Internet Protocol connectivity to determine that the Internet Protocol address obtained when initially establishing the Internet Protocol connectivity is to be re-used and a connectivity step of acquisition of the Internet Protocol address is to be skipped for reestablishing Internet Protocol connectivity between the cable modem and the cable modem termination system;

determining whether the connectivity step of acquisition of the Internet Protocol address may be skipped and that the selected one or more connectivity steps other than acquisition of the Internet Protocol address may be used to reestablish Internet Protocol connectivity;

sending a message to the cable modem indicating whether the connectivity step of acquisition of the Internet Protocol address may be skipped and that the selected one or more connectivity steps other than acquisition of the Internet Protocol address may be used in reestablishing Internet Protocol connectivity; and reestablishing Internet Protocol connectivity between the cable modem and the cable modem termination system using the Internet Protocol address obtained when initially establishing the Internet Protocol connectivity and the selected one or more connectivity steps other than acquisition of the Internet Protocol address.

13. The method of claim 12, wherein sending the message indicating whether the connectivity step of acquisition of the Internet Protocol address may be skipped and the selected one or more connectivity steps other than acquisition of the Internet Protocol address may be used in reestablishing Internet Protocol connectivity further comprises:

sending a message indicating that the selected one or more connectivity steps other than acquisition of the Internet Protocol address and one or more additional connectivity steps are to be used in reestablishing Internet Protocol connectivity.

14. The method of claim 12, wherein after Internet Protocol connectivity with the cable modem is lost, receiving a message from the cable modem indicating that a subset of the plurality of connectivity steps other than acquisition of the Internet Protocol address are selected for use reestablishing Internet Protocol connectivity, and wherein determining comprises:

determining whether execution of the subset of the plurality of connectivity steps other than acquisition of the Internet Protocol address will result in correct reestablishment of Internet Protocol connectivity.

15. The method of claim 12, wherein the plurality of connectivity steps for initially establishing Internet Protocol connectivity comprise:
   (a) forwarding the Internet Protocol address to the cable modem;
   (b) forwarding a current date and time to the cable modem; and
   (c) forwarding a configuration file to the cable modem.

16. The method of claim 12, wherein sending the message to the cable modem indicating whether the connectivity step of acquisition of the Internet Protocol address may be skipped and that the selected one or more connectivity steps other than acquisition of the Internet Protocol address may be used in reestablishing Internet Protocol connectivity comprises:
   sending an encoded ranging response.

17. The method of claim 13, wherein sending the message to the cable modem indicating whether the connectivity step of acquisition of the Internet Protocol address may be skipped and that the selected one or more connectivity steps other than acquisition of the Internet Protocol address may be used in reestablishing Internet Protocol connectivity comprises:
   sending a message indicating that a subset of the plurality of connectivity steps other than acquisition of the Internet Protocol address used to initially establish Internet Protocol activity are to be executed to reestablish Internet Protocol connectivity.

18. An apparatus comprising:
   at least one radio-frequency (RF) interface;
   at least one network interface;
   a memory; and
   a processor that:
      initially establishes Internet Protocol connectivity with a cable modem termination system through execution of a plurality of connectivity steps,
      when Internet Protocol connectivity with the cable modem termination system is lost, evaluates information received during the initial establishment of Internet Protocol connectivity to determine whether any of the received information may be used for future operations;
      determines to reuse an Internet Protocol address obtained when initially establishing the Internet Protocol connectivity and to skip a connectivity step of acquisition of the Internet Protocol address;
      determines selected one or more of the plurality of connectivity steps other than acquisition of the Internet Protocol address for use in reestablishing Internet Protocol connectivity with the cable modem termination system,
      causes a message to be sent to the cable modem termination system, wherein the message is encoded to indicate that the connectivity step of acquisition of the Internet Protocol address is to be skipped and to identify the selected one or more connectivity steps other than acquisition of the Internet Protocol address for use in reestablishing Internet Protocol connectivity,
      receives, from the cable modem termination system, a message indicating whether the connectivity step of acquisition of the Internet Protocol address may be skipped and that the selected one or more connectivity steps other than acquisition of the Internet Protocol address may be used in reestablishing Internet Protocol connectivity, and
      reestablishes Internet Protocol connectivity with the cable modem termination system using the Internet Protocol address obtained when initially establishing the Internet Protocol connectivity and the selected one or more connectivity steps other than acquisition of the Internet Protocol address.

19. The apparatus of claim 18, wherein the message indicating whether the connectivity step of acquisition of the Internet Protocol address may be skipped and the selected one or more connectivity steps other than acquisition of the Internet Protocol address may be used in reestablishing Internet Protocol connectivity comprises an indication that the selected one or more connectivity steps other than acquisition of the Internet Protocol address and one or more additional connectivity steps are to be used in reestablishing Internet Protocol connectivity.

20. The apparatus of claim 18, wherein the plurality of connectivity steps for initially establishing Internet Protocol connectivity comprise (a) obtaining the Internet Protocol address for the cable modem, (b) obtaining a current date and time, and (c) downloading a configuration file, wherein the processor is configured to determine that at least one of connectivity steps (b), or (c) is to be skipped during re-registration when reestablishing Internet Protocol connectivity.

21. The apparatus of claim 20, wherein the processor determines that the Internet Protocol address received during initial establishment of the Internet Protocol connectivity is still valid.

22. The apparatus of claim 20, wherein the processor determines that connectivity step (b) is also to be skipped during reestablishment of the Internet Protocol connectivity.

23. The apparatus of claim 20, wherein the processor determines that a configuration file received during initial establishment of the Internet Protocol connectivity is not valid and that connectivity step (c) is to be performed during reestablishment of the Internet Protocol connectivity.

24. The apparatus of claim 20, wherein the processor determines that connectivity steps (b) and (c) are both to be performed when reestablishing Internet Protocol connectivity.

25. An apparatus comprising:
   at least one radio-frequency (RF) interface;
   at least one network interface;
   a memory; and
   a processor that:
      initially establishes Internet Protocol connectivity between a cable modem and a cable modem termination system through execution of a plurality of connectivity steps,
      when Internet Protocol connectivity between the cable modem and the cable modem termination system is lost, receives a message from the cable modem indicating that the connectivity step of acquisition of the Internet Protocol address is to be skipped and identifying selected one or more of the plurality of connectivity steps other than acquisition of the Internet Protocol address for use in reestablishing Internet Protocol connectivity, wherein the selected one or more connectivity steps other than acquisition of the Internet Protocol address were identified by evaluating information received by the cable modem during the initial establishment of Internet Protocol connectivity to determine that the Internet Protocol address obtained when initially establishing the Internet Protocol connectivity is to be re-used and a connectivity step of acquisition of the Internet Protocol address is to be skipped for re-establishing Internet Protocol connectivity between the cable modem and the cable modem termination system, determines whether the connectivity step of acquisition of the Internet Protocol address may be skipped and that the selected one or more connectivity steps other than acquisition of the Internet Protocol address may be used to reestablish Internet Protocol connectivity, causes a message to be sent to the cable modem indicating whether the connectivity step of acquisition of the Internet Protocol address may be skipped and that the selected one or more connectivity steps other than acquisition of the Internet Protocol address may be used in reestablishing Internet Protocol connectivity; and reestablishes Internet Protocol connectivity between the cable modem and the cable modem termination system using the Internet Protocol address obtained when initially establishing the Internet Protocol connectivity and the selected one or more connectivity steps other than acquisition of the Internet Protocol address.

26. The apparatus of claim 25, wherein the message indicating whether the connectivity step of acquisition of the Internet Protocol address may be skipped and the selected one or more connectivity steps other than acquisition of the Internet Protocol address may be used in in reestablishing Internet Protocol connectivity comprises an indication that the selected one or more connectivity steps other than acquisition of the Internet Protocol address and one or more additional connectivity steps are to be used in reestablishing Internet Protocol connectivity.

27. The apparatus of claim 25, wherein after Internet Protocol connectivity with the cable modem is lost, the processor receives a message from the cable modem indicating that a subset of the plurality of connectivity steps other than acquisition of the Internet Protocol address are selected for use reestablishing Internet Protocol connectivity, and determines whether execution of the subset of connectivity steps other than acquisition of the Internet Protocol address will result in correct reestablishment of Internet Protocol connectivity.

28. The apparatus of claim 26, wherein the processor causes a message to be sent that indicates that a subset of the plurality of connectivity steps other than acquisition of the Internet Protocol address used to initially establish Internet Protocol activity are to be executed to reestablish Internet Protocol connectivity.

* * * * *